United States Patent

Henriksson

[11] Patent Number: 5,845,219
[45] Date of Patent: Dec. 1, 1998

[54] MOBILE STATION HAVING PRIORITY CALL ALERTING FUNCTION DURING SILENT SERVICE MODE

[75] Inventor: Hannu Henriksson, Oulunsalo, Finland

[73] Assignee: Nokia Mobile Phones Limited, Salo, Finland

[21] Appl. No.: 697,981

[22] Filed: Sep. 4, 1996

[51] Int. Cl.$^6$ ............................ H04M 1/00; H04M 1/27
[52] U.S. Cl. ........................................ 455/567; 379/375
[58] Field of Search .................................. 455/414, 415, 455/458, 567; 379/82, 142, 157, 373, 375, 376

[56] References Cited

U.S. PATENT DOCUMENTS

| | | | |
|---|---|---|---|
| 4,278,844 | 7/1981 | Jones | 379/157 |
| 4,873,719 | 10/1989 | Reese | 379/215 |
| 4,924,496 | 5/1990 | Figa et al. | 379/142 |
| 4,998,291 | 3/1991 | Marui et al. | 455/563 |
| 5,029,196 | 7/1991 | Morganstein | 379/88.23 |
| 5,272,475 | 12/1993 | Eaton et al. | 455/567 |
| 5,404,391 | 4/1995 | Wavroch et al. | 455/567 |
| 5,452,354 | 9/1995 | Kyronlahti et al. | 379/375 |
| 5,495,517 | 2/1996 | Ide et al. | 455/567 |
| 5,530,736 | 6/1996 | Comer et al. | 455/567 |
| 5,553,125 | 9/1996 | Martensson | 455/412 |
| 5,651,052 | 7/1997 | Serrano | 455/567 |
| 5,722,071 | 2/1998 | Berg et al. | 455/567 |

FOREIGN PATENT DOCUMENTS

| | | |
|---|---|---|
| 0 330 856 A2 | 9/1989 | European Pat. Off. . |
| 0 347 155 A2 | 12/1989 | European Pat. Off. . |
| 0 355 777 A2 | 2/1990 | European Pat. Off. . |
| 2 173 069 | 10/1986 | United Kingdom . |
| 2 248 709 | 4/1992 | United Kingdom . |
| 2 250 891 | 6/1992 | United Kingdom . |

*Primary Examiner*—Willis R. Wolfe
*Attorney, Agent, or Firm*—Perman & Green, LLP

[57] ABSTRACT

A method includes the steps of (a) storing at least one predetermined telephone number in a memory (24, 24a) of a mobile station (10); and (b) in response to the receipt of an incoming call indication when a silent service mode is active, comparing at least a portion of the telephone number of the calling party to the stored at least one predetermined telephone number. If the received calling party number matches one of the stored numbers, the method executes a step of generating an audible alert to inform the user of the presence of the incoming call. If the received calling party number does not match one of the stored numbers, the method instead executes a step of inhibiting the generation of an audible alert. In one embodiment of this invention the step of generating an audible alert generates a predetermined audible alert that is different from an audible alert that is used when an incoming call is received when the silent service mode is not active.

8 Claims, 3 Drawing Sheets

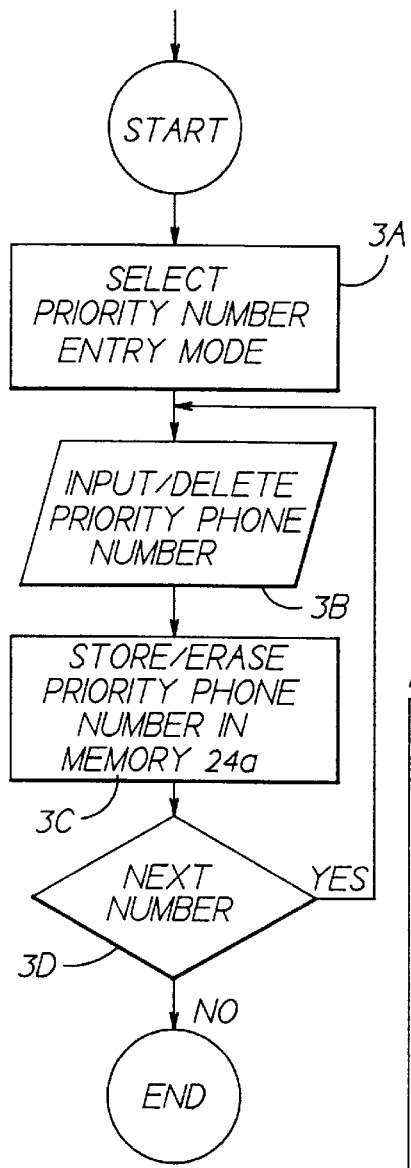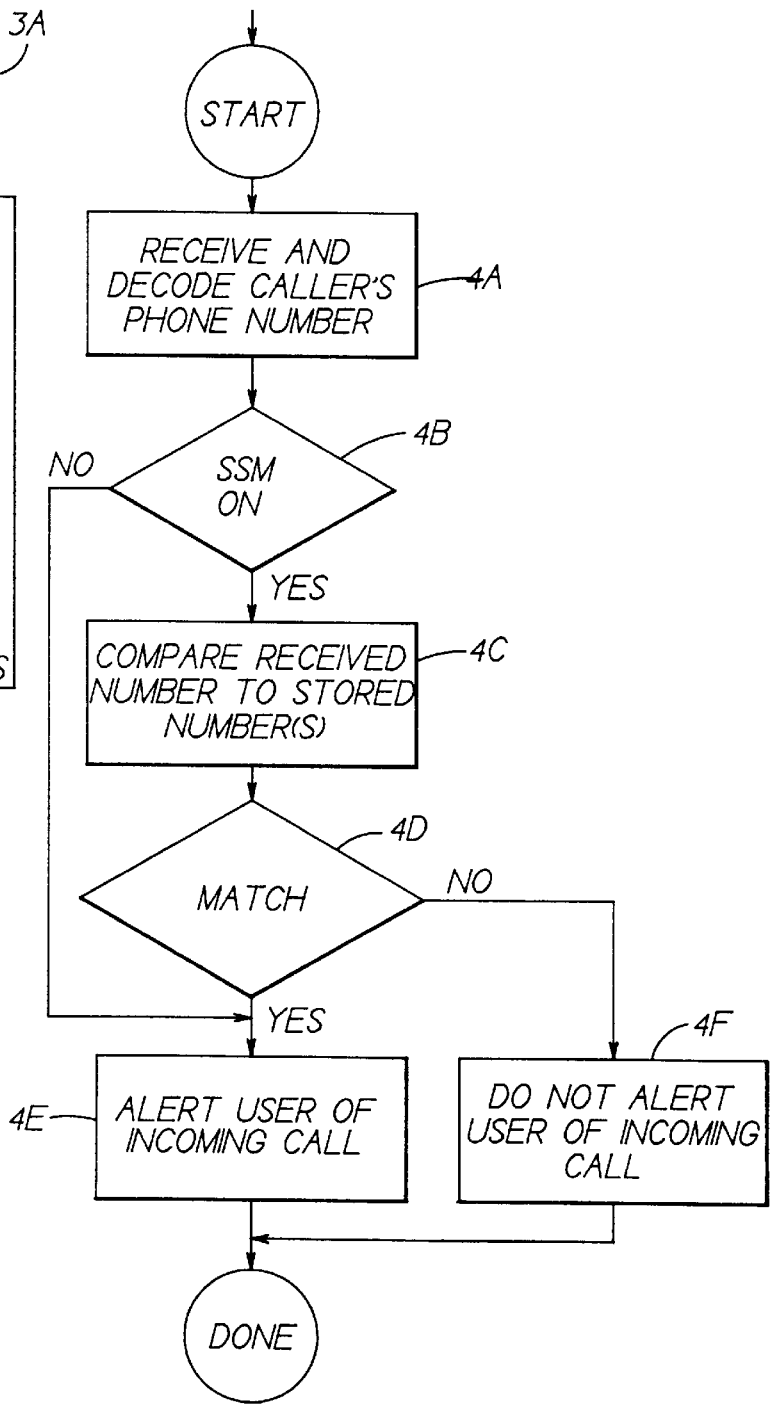

MOBILE STATION HAVING PRIORITY CALL ALERTING FUNCTION DURING SILENT SERVICE MODE

FIELD OF THE INVENTION

This invention relates generally to radiotelephones and, in particular, to radiotelephones or mobile stations such as those capable of operation with a cellular network.

BACKGROUND OF THE INVENTION

One user-selectable feature that is provided in some mobile stations is known as a Silent Service Mode (SSM), wherein a user can disable the mobile station from generating an audible alerting tone when an incoming call is received. This feature is particularly beneficial when the user is in a situation where the generation of an audible alerting tone would be inappropriate or distracting (e.g., during a meeting or during a concert or recital). In this case the phone number of the calling party may be displayed on a display screen of the mobile station. However, unless the mobile station is equipped with a tactile alerting device (e.g., a vibrator), the user may not be aware of the incoming call. Furthermore, and unless the mobile station is physically located on the user's person, the activation of the tactile alerting device may not be adequate to alert the user to the presence of the incoming call.

As may be appreciated, at certain times the user may be expecting an important call, or there may be some callers that the user must immediately respond to, regardless of the user's location or present circumstance. As such, the use of the conventional Silent Service Mode can prove disadvantageous in these situations, and can result in the user missing an important incoming call.

OBJECTS OF THE INVENTION

It is thus a first object of this invention to provide an improved Silent Service Mode of operation for a mobile station.

It is a further aspect of this invention to provide an improved Silent Service Mode of operation for a mobile station, wherein the user is enabled to enter or designate one or more priority telephone numbers in a memory of the mobile station, and wherein an audible alerting tone is generated when a telephone number of an incoming call matches a stored priority number, regardless of whether the Silent Service Mode is active or not active.

SUMMARY OF THE INVENTION

The foregoing and other problems are overcome and the objects of the invention are realized by methods and apparatus in accordance with embodiments of this invention. A method of this invention is disclosed for operating a mobile or user station of a type that is bidirectionally coupled through an RF interface to a network, as is a mobile station that operates in accordance with the method.

The method includes the steps of (a) storing at least one predetermined telephone number in a memory of the mobile station; and (b) in response to the receipt of an incoming call indication when a silent service mode is active, comparing at least a portion of the telephone number of the calling party to the stored at least one predetermined telephone number. If the received calling party number, or portion thereof, matches one of the stored numbers, the method executes a step of generating an audible alert to inform the user of the presence of the incoming call. If the received calling party number does not match one of the stored numbers, the method instead executes a step of inhibiting the generation of an audible alert.

In one embodiment of this invention the step of generating an audible alert generates a predetermined audible alert that is different from an audible alert that is used when an incoming call is received when the silent service mode is not active.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 is a logic flow diagram that illustrates a first method in accordance with this invention, specifically a method wherein a user is enabled to enter and delete priority telephone numbers stored in a memory of the mobile station of FIGS. 1 and 2; and FIG. 4 is a logic flow diagram that illustrates the operation of the mobile station of FIGS. 1 and 2 when an incoming call is received.

DETAILED DESCRIPTION OF THE INVENTION

Figure 1:
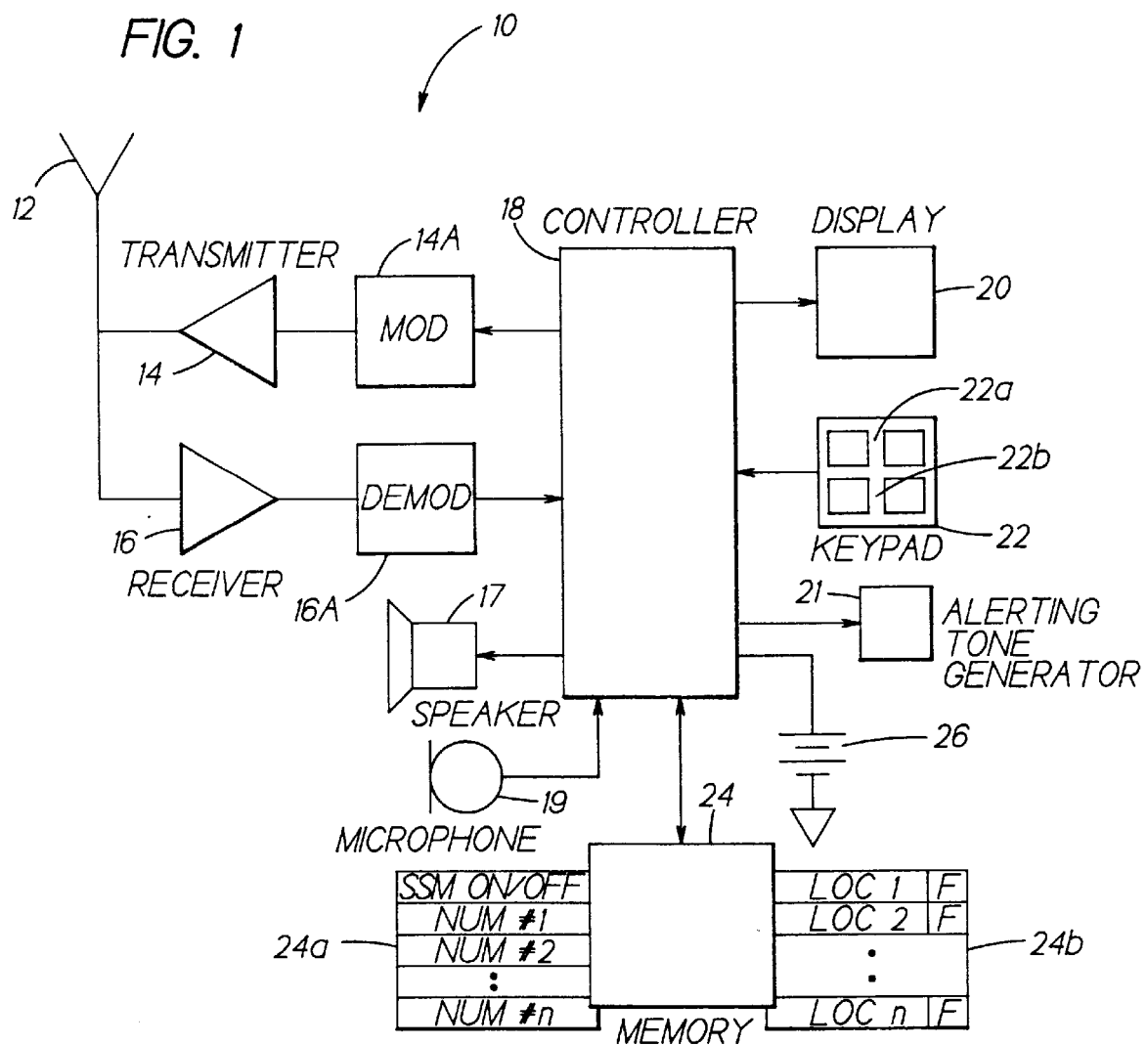
FIG. 1 is a block diagram of a mobile station that is constructed and operated in accordance with this invention.
Figure 2:
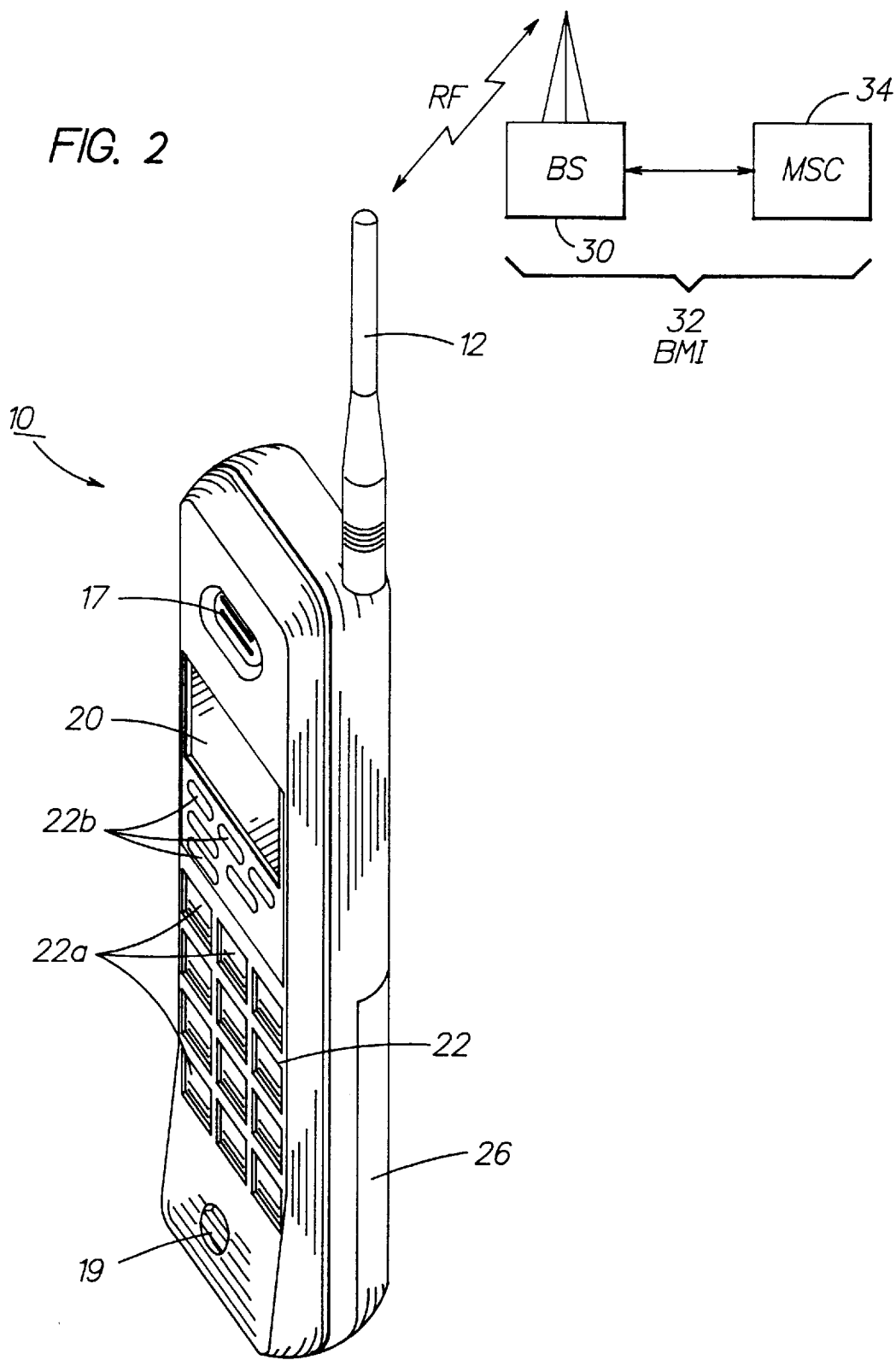
FIG. 2 is an elevational view of the mobile station shown in FIG. 1, and which further illustrates a cellular communication system to which the mobile station is bidirectionally coupled through wireless RF links.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a Base Station/Mobile Switching Center/Internetworking Function (BMI) 32 that includes a Mobile Switching Center (MSC) 34. The MSC 34 provides a connection to landline trunks when the mobile station 10 is engaged in a call.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

The air interface standard is assumed for this invention to include a capability to transmit the calling parties telephone number to the mobile station 10. One suitable, but not limiting, air interface standard is known as IS-136.1, Rev. A (Feb. 12, 1996), wherein a Page message (Section 6.4.3.9) is defined to include a calling party number information field (defined in Section 6.5). The Page message is sent on a digital control channel (DCCH), specifically on a Short Message Service, Paging, and Access Response Channel (collectively referred to as the SPACH).

Returning to FIGS. 1 and 2, a user interface includes a conventional earphone or speaker 17, a conventional microphone 19, a display 20, and a user input device, typically a keypad 22, all of which are coupled to the controller 18. An alerting tone generator 21, such as a buzzer, may also be included. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including user messages, that is received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as AMPS, GSM and IS-95 (CDMA). Narrow-band AMPS (NAMPS), as well as TACS, mobile stations may also benefit from the teaching of this invention. It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the method described below in relation to FIG. 3 and 4.

In accordance with an embodiment of this invention the memory 24 includes a portion, which may be referred to as a short code memory (SCM) 24a, that stores one or more priority telephone numbers (NUM #1-NUM #n) that are entered by the user in accordance with the method illustrated in FIG. 3. The memory 24, or the SCM 24a, may also store a Silent Service Mode (SSM) flag which indicates whether the SSM is enabled (on) or disabled (off). The controller 18 accesses the SCM 24a when an incoming call is indicated and operates in accordance with the method described in FIG. 4.

More particularly, and referring now to FIG. 3, there is illustrated a method for inputting and deleting priority phone numbers in the SCM 24A. At Block 3A the user interacts with the controller 18 using the keypad 22 and the display 20 to select a priority number entry mode. At Block 3B the user inputs or deletes a priority phone number, and at Block 3C the controller 18 either stores or erases the priority phone number in the memory 24A. When deleting priority phone numbers the controller 18 may display any stored priority phone numbers to the user, and the user then is enabled to depress one or more of the keypad keys to cause the displayed number to be erased from the memory 24a. At Block 3D, if there is another number to enter or delete, control passes back to Block 3B, otherwise the method terminates. Using the method of FIG. 3 the user is thus enabled to enter at least one predetermined priority phone number for storage in the memory 24A.

It is assumed that another user interface function enables the SSM flag to be toggled on or off at the user's request.

Reference is now made to FIG. 4 for illustrating a method executed by the controller 18 when an incoming call is indicated (i.e., a mobile terminated call received from the BMI 32 over the RF interface). At Block 4A the mobile station 10 receives and decodes a Page message that is directed to the mobile station 10, and extracts the calling party number from the message field defined for this purpose. As was indicated above, for an IS-136 embodiment of this invention the calling party number can be determined from a Page message sent over the SPACH. At Block 4B the controller 18 examines the SSM flag in the memory 24a to determine if the SSM is on or off. If it is determined that the SSM is not on, control passes to Block 4E where the controller 18 generates an audible tone, via the alerting tone generator 21, for alerting the user in a conventional fashion. In some embodiments the speaker 17 could be used for this purpose. If at Block 4B it is determined that the SSM is on, control passes instead to Block 4C.

At Block 4C the controller 18 compares the received calling party number to the priority number(s) stored in memory 24a. If no match is found, control passes to Block 4F. In this case the controller 18 does not generate an audible alert indicating the presence of the incoming call. That is, for the case where no stored priority number is equal to the incoming calling party number, and the SSM is on, no audible alerting tone is generated. The controller 18 may, however, activate a tactile alerting device (such as a vibrator) for notifying the user of the incoming call. The controller 18 may also display the calling party number on the display 20. However, an audible tone is not generated.

Returning to Block 4D, if the incoming calling party number does match a stored priority number, control passes to Block 4E, and the controller 18 generates an audible alert. In this manner the user is informed of the presence of an incoming call being made from a telephone having a telephone number that has been previously identified by the user (FIG. 3) as being a priority telephone number.

It is within the scope of the teaching of this invention to enable the user to specify a distinct alerting tone to be used only when the SSM is on and a call is made from a priority telephone number. That is, one type of alerting tone can be specified for use when the SSM flag is off, and a different type of alerting tone can be specified for use when the SSM flag is on and a priority call is received.

It is also within the scope of this invention to employ a separate portion of the short code memory (SCM), shown as 24b in FIG. 1, having locations 1–n that are normally used for storing, by example, speed-dialing telephone numbers. In this embodiment the user is enabled to designate a particular number (e.g., one stored in location 2) as also being a number that generates an alerting tone even when the SSM is activated (i.e., as an SSM-override telephone number). In this regard a flag (F) can be associated with each stored number. If the flag (F) is set, then the number is marked as being a number that, if a call is made from the number while the SSM is active, will cause an audible alerting tone to be generated. The flag (F) can be set when the number is first entered into the memory 24b (e.g., before storing the number the user is prompted to indicate whether the number is also a SSM-override number), or the user interface can be employed to subsequently display and then mark one or more of the stored speed-dialing numbers as also being a SSM-override number. The user interface can also be employed to reset the flag (F), as desired by the user.

When using the SCM 24b, the controller 18 examines all stored numbers, whose flag (F) is set, upon the receipt of a call when the mobile station 10 is in the SSM. If the incoming caller's number matches one of the numbers in the memory 24b, whose flag (F) is set, then the method enters the Block 4F of FIG. 4, as previously described.

In some embodiments of this invention it may be desirable to not provide the memory 24a, and to use instead only the memory 24b, while in other embodiments both memories 24a and 24b may be provided. In this latter case the controller 18 examines both of the memories 24a and 24b when an incoming call is received when the SSM is active.

If both memory areas 24a and 24b are used, then the controller 18 may default to checking the SSM memory area 24a first, and if a match is not found, may then check the SCM 24b for the presence of a matching telephone number having the flag set.

It is also within the scope of this invention to compare only a portion of an incoming call to the stored number(s) in memory 24a and/or memory 24b. In this case the user employs the user interface to designate only a portion of a phone number (for example, only an area code portion) when entering the SSM or a SSM telephone number, such that any call originating from an area code that matches a stored area code portion of a SSM-override number is treated as a SSM-override number. It can be appreciated that in this case the user may be enabled to enter only a portion of a telephone number (e.g., the area code) into the memory 24a, with the rest of the number being set to some default value.

Although described in the context of preferred embodiments, it should be realized that a number of modifications to these teachings may occur to one skilled in the art. By example, certain of the steps shown in the logic flow diagrams of FIGS. 3 and 4 can be executed in other than the order shown, while still obtaining the same result. Also, the user interface function for entering and deleting priority telephone numbers can be performed instead with a separate keypad and/or display, such as with a data processor that is coupled to a data port and internal data bus of the mobile station 10.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a mobile station of a type that is bidirectionally coupled through an RF interface to a network, comprising the steps of:

storing at least one predetermined telephone number in a memory of a mobile station; and in response to the receipt of an incoming call indication when a silent service mode is active, comparing at least a portion of a telephone number of the calling party to the stored at least one predetermined telephone number and, if at least a portion of the received calling party number matches one of the stored numbers, generating an audible alert to inform the user of the presence of the incoming call, otherwise, if at least the portion of the received calling party number does not match one of the stored numbers, inhibiting the generation of an audible alert.

2. A method as set forth in claim 1, wherein the step of generating an audible alert generates a predetermined audible alert that is different from an audible alert that is used when an incoming call is received when the silent service mode is not active.

3. A mobile station of a type that is bidirectionally coupled through an RF interface to a network, comprising:

a RF receiver for receiving an incoming call indication from the network, the incoming call indication including a calling party telephone number;

a user interface for enabling a user to enter information;

a memory for storing at least one predetermined telephone number that is entered by the user; and a controller, responsive to the receipt of an incoming call indication when a silent service mode (SSM) is active, for comparing at least a portion of the telephone number of the calling party to the stored at least one predetermined telephone number and, if at least the portion of the received calling party telephone number matches one of the stored numbers, for overriding the active SSM by generating an audible alert to inform the user of the presence of the incoming call, said controller being further responsive to a condition wherein at least the portion of the received calling party telephone number does not match one of the stored numbers, for inhibiting the generation of an audible alert.

4. A mobile station as set forth in claim 3, wherein the controller generates a predetermined audible alert that is different from an audible alert that is used when an incoming call is received when the silent service mode is not active.

5. A mobile station as set forth in claim 3, wherein the memory is comprised of a first memory portion for storing at least one SSM-override telephone number to which at least a portion of the telephone number of a calling party is compared, and is further comprised of a second memory portion for storing at least one speed dialling telephone number, the speed dialling telephone number having an associated flag for indicating, when set, that the speed dialling telephone number is also an SSM-override telephone number.

6. A mobile station as set forth in claim 5, wherein the controller is responsive to the receipt of an incoming call indication, when the silent service mode (SSM) is active, for comparing at least the portion of the telephone number of the calling party to the stored at least one SSM-override telephone number stored in the first memory portion, and also for comparing at least the portion of the telephone number of the calling party to any stored speed-dialing telephone number stored in the second memory whose associated flag is set.

7. A method for operating a mobile station of a type that is coupled through an RF interface to a network, comprising the steps of:

storing at least one Silent Service Mode (SSM override telephone number in a first memory area of a mobile station;

storing at least one other telephone number in a second memory area of the mobile station;

setting a flag associated with at the at least one other telephone number stored in the second memory area for indicating that the associated telephone number is also an SSM override telephone number;

in response to the receipt of an incoming call indication, determining if the SSM is active;

if the SSM is determined to be active, comparing at least a portion of a telephone number of the calling party to the at least one stored SSM override telephone number stored in the first memory area and, if a match is not found, comparing at least the portion of the telephone number of the calling party to any telephone number stored in the second memory area that has the associated flag set; and upon an occurrence of at least the portion of the telephone number of the calling party matching one of the compared telephone numbers, generating an audible alert.

8. A method as set forth in claim 7, wherein the step of generating an audible alert generates a predetermined audible alert that is different from an audible alert that is used when an incoming call is received when the SSM is determined not to be active.

* * * * *

US005845219C1

(12) EX PARTE REEXAMINATION CERTIFICATE (10484th)
United States Patent
Henriksson

(10) Number: US 5,845,219 C1
(45) Certificate Issued: Jan. 29, 2015

(54) MOBILE STATION HAVING PRIORITY CALL ALTERING FUNCTION DURING SILENT SERVICE MODE

(75) Inventor: Hannu Henriksson, Oulunsalo (FI)

(73) Assignee: Mobilemedia Ideas LLC, Chevy Chase, MD (US)

Reexamination Request:
No. 90/011,435, Jan. 14, 2011
No. 90/012,126, Feb. 3, 2012

Reexamination Certificate for:
Patent No.: 5,845,219
Issued: Dec. 1, 1998
Appl. No.: 08/697,981
Filed: Sep. 4, 1996

(51) Int. Cl.
 H04M 1/663 (2006.01)
 H04M 1/66 (2006.01)
 H04M 1/57 (2006.01)
(52) U.S. Cl.
 USPC .................................... 455/567; 379/373.02
(58) Field of Classification Search
 None
 See application file for complete search history.

(56) References Cited

To view the complete listing of prior art documents cited during the proceedings for Reexamination Control Numbers 90/011,435 and 90/012,126, please refer to the USPTO's public Patent Application Information Retrieval (PAIR) system under the Display References tab.

*Primary Examiner* — Roland Foster

(57) ABSTRACT

A method includes the steps of (a) storing at least one predetermined telephone number in a memory (24, 24a) of a mobile station (10); and (b) in response to the receipt of an incoming call indication when a silent service mode is active, comparing at least a portion of the telephone number of the calling party to the stored at least one predetermined telephone number. If the received calling party number matches one of the stored numbers, the method executes a step of generating an audible alert to inform the user of the presence of the incoming call. If the received calling party number does not match one of the stored numbers, the method instead executes a step of inhibiting the generation of an audible alert. In one embodiment of this invention the step of generating an audible alert generates a predetermined audible alert that is different from an audible alert that is used when an incoming call is received when the silent service mode is not active.

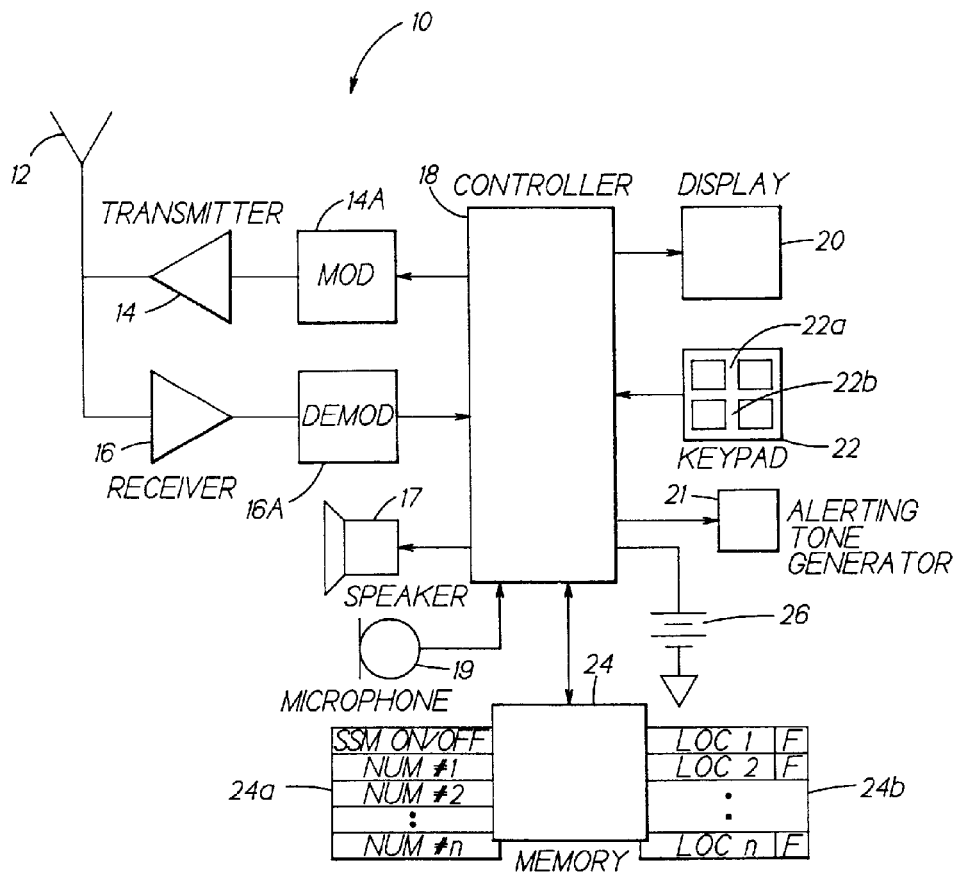

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-8 are cancelled.

\* \* \* \* \*